US 12,067,038 B2

(12) United States Patent
Stowell et al.

(10) Patent No.: US 12,067,038 B2
(45) Date of Patent: Aug. 20, 2024

(54) SYSTEM AND METHOD FOR ADAPTIVE SEARCH RESPONSES

(71) Applicant: ORACLE INTERNATIONAL CORPORATION, Redwood Shores, CA (US)

(72) Inventors: David Stowell, San Francisco, CA (US); Liviu S. Matei, Bucharest (RO)

(73) Assignee: Oracle International Corporation, Redwood Shores (CA)

(*) Notice: Subject to any disclaimer, the term of this patent is extended or adjusted under 35 U.S.C. 154(b) by 0 days.

(21) Appl. No.: 18/093,206

(22) Filed: Jan. 4, 2023

(65) Prior Publication Data

US 2024/0220518 A1 Jul. 4, 2024

(51) Int. Cl.
*G06F 16/00* (2019.01)
*G06F 16/2457* (2019.01)
*G06F 16/33* (2019.01)
*G06F 16/332* (2019.01)

(52) U.S. Cl.
CPC .... *G06F 16/3328* (2019.01); *G06F 16/24578* (2019.01); *G06F 16/3347* (2019.01)

(58) Field of Classification Search
CPC .......... G06F 16/24578; G06F 16/3328; G06F 16/3347
See application file for complete search history.

(56) References Cited

U.S. PATENT DOCUMENTS

| | | | |
|---|---|---|---|
| 7,283,997 B1* | 10/2007 | Howard, Jr. | G06F 16/9535 707/999.005 |
| 7,461,059 B2 | 12/2008 | Richardson et al. | |
| 9,489,460 B2 | 11/2016 | Wexler et al. | |
| 9,760,608 B2 | 9/2017 | Cavanagh et al. | |
| 2002/0103798 A1* | 8/2002 | Abrol | G06F 16/335 707/E17.084 |
| 2006/0026147 A1 | 2/2006 | Cone et al. | |
| 2008/0104045 A1* | 5/2008 | Cohen | G06F 16/9535 |

(Continued)

FOREIGN PATENT DOCUMENTS

WO 2015081160 A1 6/2015

OTHER PUBLICATIONS

Kuehua Shen et al., Implicit User Modeling for Personalized Search; pp. 824-831; Oct. 31, 2005; Dept. of Computer Science, University of Illinois at Urbana-Champaign.

(Continued)

*Primary Examiner* — Diedra McQuitery
(74) *Attorney, Agent, or Firm* — Kraguljac Law Group, LLC

(57) ABSTRACT

Systems, methods, and other embodiments associated with an adaptive search system are described. In one embodiment, user actions are monitored on a search results list in a graphical user interface, wherein the search results list is obtained based on a query vector representing a search query. The query vector is dynamically modified in response to the user actions on a selected result document by shifting the query vector away from the selected result document in a vector space in response to the user rejecting the selected result document. A revised search results list is then generated without the user changing the search query by executing the modified query vector in a search.

20 Claims, 5 Drawing Sheets

(56) References Cited

U.S. PATENT DOCUMENTS

| | | | |
|---|---|---|---|
| 2011/0184925 A1* | 7/2011 | Muth | G06F 16/2477 |
| | | | 707/706 |
| 2015/0032717 A1* | 1/2015 | Cramer | G06F 16/24575 |
| | | | 707/709 |
| 2015/0302036 A1* | 10/2015 | Kumar | G06F 16/3325 |
| | | | 707/711 |
| 2016/0378804 A1* | 12/2016 | Hopcroft | G06F 16/2237 |
| | | | 707/715 |
| 2017/0039198 A1* | 2/2017 | Ramamurthy | G06F 16/904 |
| 2022/0382818 A1 | 12/2022 | Chen et al. | |

OTHER PUBLICATIONS

Ahu Sieg et al., Web Search Personalization with Ontological User Profiles; pp. 525-534; Nov. 6, 2007; Center for Web Intelligence, School of Computer Science, Telecommunication and Information Systems, DePaul University.

MICROSOFT: "Add the Knowledge Base Search Control to Forms", Article Jan. 29, 2022 retrieved from https://docs.microsoft.com/en-us/dynamics365/customer-service/add-knowledge-base-search-control-forms (16 pgs).

MICROSOFT: "AI Lab Projects—Vector Search", retrieved from https://www.microsoft.com/en-GB/ai/ai-lab-vector-search, (c) Microsoft 2022 (7 pgs).

Shenoy, Sharanya: "Vector-Based Semantic Search using Elasticsearch", retrieved from https://medium.com/version-1/vector-based-semantic-search-using-elasticsearch-48d7167b38f5, Published in Version 1, Jun. 4, 2020 (16 pgs).

* cited by examiner

SYSTEM AND METHOD FOR ADAPTIVE SEARCH RESPONSES

BACKGROUND

A search engine is a software system configured to perform searches on a network such as the Internet, World Wide Web, corporate networks, and/or private networks. In general, when a user is looking for certain information, the user enters a search query into a search engine. The search query is typically in plain text and includes a few words or phrases that the user believes describe the information the user is looking for. The search engine scans its index of web pages or other documents to find results that are relevant to the search query. The search results are typically displayed in a ranked or prioritized list of result documents based on relevancy.

In prior systems, a search is a 'one and done' action, meaning once the search engine displayed the search results list for a search query, the search engine performed no other action. The user would then go through the result documents looking for the information. If the user did not find what they wanted in the first result document, they moved on to the next result document and so on. In the meantime, the search engine was disconnected from the process and did not perform any other action.

When the user determined that the result documents were not quite right or not what the user was looking for, the user was required to manually rewrite the search query with different terms based on a subjective guess as to how the search engine would respond. Then the user had to resubmit the new search query to the search engine. The process was then repeated until the user found what they were looking for or stopped searching, which is an inefficient searching process.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that provide an adaptive search system configured to improve search results dynamically. In one embodiment, when a user performs a search based on a search query statement, a search results list is generated by a search engine. As the user interacts with the search results list, the adaptive search system detects user actions. Based on the types of user actions, the system determines whether the user rejected/discounted a result document or accepted a result document from the search results list. The present system is configured to dynamically respond to certain user actions and dynamically change the search results without the user having to go back and manually rewrite or adjust the query statement themselves and manually reissue the query.

In this manner, the present system takes into account user actions to adjust the search results in real time to more closely fit what the user is looking for, which previous systems did not do. Thus, the search results from one original query may be adjusted one or multiple times by the present system to continuously improve the search results in response to the user rejecting (or accepting) one or more result documents.

Definitions

A "result document" or "document" are used herein to generally describe, but is not limited to, any search result provided by a search engine in response to a search query. Search results refer to a list of result documents that are returned by a search engine and displayed on a graphical user interface. A result document, as displayed in the search results list, may include a brief summary of its content and/or a hyperlink (link) to: a document, a web page(s), an article, a research paper, an image, a video, an infographic, and/or other file types or objects that represent the result document.

System Overview

Figure 1:
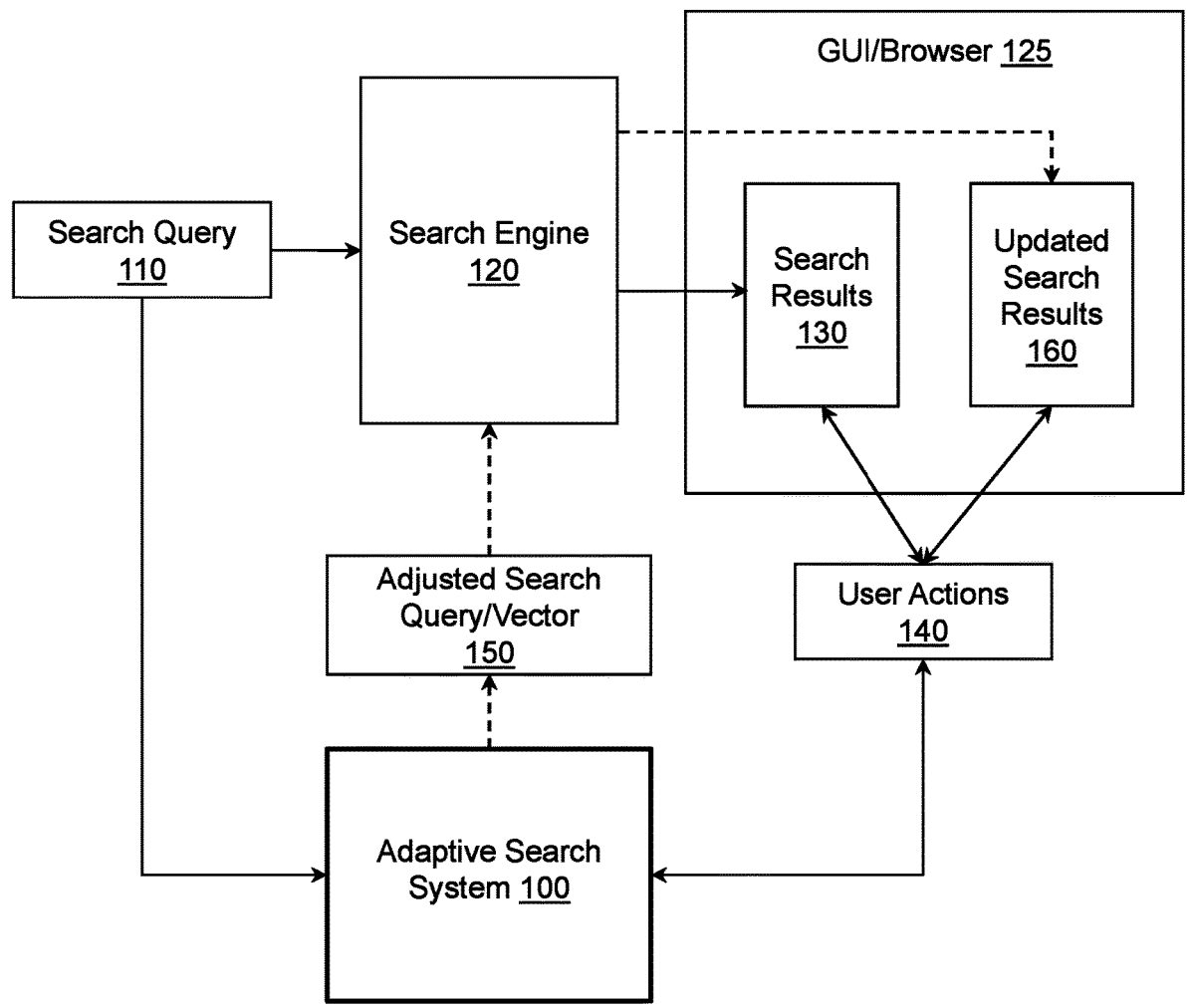
FIG. 1 illustrates one embodiment of an adaptive search system that may be associated with a search engine.

With reference to FIG. 1, one embodiment of an adaptive search system 100 is illustrated that is associated with dynamically changing search results based on user actions. The adaptive search system 100 may be implemented as part of a computing system/device as an executable module of processor executable instructions. In one embodiment, a computing device may include a browser that is used to access a search engine to perform search queries on the Internet or other computer network. The adaptive search system 100 may be an extension installed on the browser, in one embodiment, or may be part of a server. In another embodiment, the adaptive search system 100 may be implemented as part of a search engine.

The following example is described with reference to a user who creates a search query 110 and submits the search query 110 to a search engine 120. The search engine 120 then, based on the search query, generates and returns search results 130 that represent a list of result documents that the search engine 120 determined were the best matching documents to the search query 110.

In one embodiment, the search query 110 is typically created using one or more keywords or phrases. The search query 110 may be converted into a vector that numerically represents the query (e.g., a feature vector). The search query may be converted into a vector by the search engine 120 or by a preprocessing algorithm prior to submitting the vector to the search engine 120.

Likewise, documents, images, and other objects in a repository/database may also be represented by their own feature vectors that numerically represent their content. Each feature vector may have hundreds of features and thus hundreds of dimensions (e.g., has 300 dimensions, 700 dimensions, etc.). Each vector is defined by a vector point in vector space according to the values of all the dimensions/features of the vector. Thus in one embodiment, to find the closest matching documents/objects to a search query, a search engine identifies and returns documents/objects whose feature vector points are "closest" to the query vector point. In another embodiment, the search query 110 may be in a text/keyword format and the search engine 120 may be configured to perform matching based on the text/keywords as compared to content in a repository of documents/objects. This may include using a natural language processor to process and understand the search query.

After the search results 130 are generated by the search engine 120, the search results 130 may be displayed on a graphical user interface (GUI) 125. For example, the search results 130 may be displayed as a list of documents, webpages, or other results in a ranked order. The GUI 125 may be part of an internet browser or other search system application that may operate on a non-public network.

In one embodiment, the adaptive search system 100 is configured to monitor user actions 140 that the user performs on the search results 130 and in the GUI 125. The adaptive search system 100 attempts to determine whether the user actions 140 indicate that the user accepted or rejected particular result documents from the search results 130.

In general, a result document from the search results 130 may be considered as "accepted" when the user believes the result document is a match to the search query and has content that the user is looking for. Conversely, a result document may be considered as "rejected" or "discounted" when the user believes the result document is not a match to the search query and/or has content that the user is not looking for. For example, if a user submits a search query with the term "jaguar" with the intent of looking for a car, the search engine may return some result documents that discuss a jaguar animal. Upon review, the user may reject one or more result documents related to the animal. The adaptive search system 100 is configured to determine whether particular result documents are accepted or rejected by the user based on the user actions 140 while the user is interacting with the search results 130. This is described in more detail with reference to FIG. 2.

The user actions 140 include, for example but are not limited to, clicking/selecting certain result documents, opening and visiting webpages associated with certain result documents, viewing a result document for a time period (dwell time), closing webpages associated with a result document, not clicking/selecting a highly ranked result document, clicking/selecting a lower ranked result document, providing feedback as to whether a result document is accepted or rejected (e.g., by clicking a thumbs up icon or thumbs down icon), etc.

Based on the determinations from the user actions 140, in response to determining that the user has rejected or discounted a result document, the adaptive search system 100 dynamically modifies or adjusts the search results 130 to provide an adaptive response to the original search query. For example, the system 100 takes into account the user's actions and causes the search results 130 to dynamically change without the user having to go back and adjust the search query 110 manually and without having the user resubmit a new search query.

For example, the adaptive search system 100 generates an adjusted search query 150 by dynamically modifying the original search query 110 based on the rejected result document. For example, the modification may include adjusting a search query vector of the search query (when the search engine 120 is configured to process query vectors). The adjusted search query/vector 150 is then submitted to the search engine 120 by the system 100 in a background process.

This causes new updated search results 160 to be generated that are improved over the previous search results 130 since the updated search results are adaptive responses to the user actions. This is also an improvement over previous search engines that are static and do not update or revise search results dynamically in real time.

In one embodiment, for a search query that is represented by query vector Q, the search engine 120 may generate and return a result set R[1 . . . n]. In general, the position or point of the query vector Q in the vector space determines which document vectors are closest to the same point in the vector space. The closest document vectors (e.g., nearest neighbors) are identified and selected as the best matching search result set R[1 . . . n]. In one embodiment, identifying the best matching documents is performed by a vector search mechanism using a vector proximity calculation, which may be a component of the search engine 120.

The first result document R[1] in the result set is typically the document whose vector is closest (most proximate) to the query vector Q in the vector space. Thus, result document R[1] is considered the highest-ranking and best matching result document in the result set. If the user rejects or discounts result document R[1], which is the highest-ranking result document, R[1] might no longer be the best result.

As such, the adaptive search system 100 is configured to dynamically modify the original query vector Q to create a modified query vector Q'. For example, the query vector Q' may be obtained on shifting or adjusting query vector Q "away" from result R[1] in the vector space, which should change and improve the result set. Thus, the rejection of R[1] might push the result set out of the original position in the vector space of the query vector Q and into a different space of query vector Q'.

The modified query vector Q' is then automatically submitted to the search engine 120 by the adaptive search system 100. Submitting the modified query vector Q' to the search engine may occur in response to the result document being rejected and/or in response to the original query vector being modified, which indicates a changed response. The search engine 120 executes a new search based on the modified query vector Q' to generate a revised/updated search results list 160 without the user changing the original search query 110.

In general, the adaptive search system 100 responds to the rejection of the first document R[1] and in the moment (in real-time) recalculates a best possible (new) prioritized list of search results. In one embodiment, the recalculation and adjustment of the search results may be performed continuously each time the system 100 detects that the user rejected a result document. This provides an advantage over previous search techniques in that during a single search query submitted by a user, the adaptive search system 100 causes the search engine 120 to generate increasingly improved targeted search results as each result document is rejected/discounted by the user via the user actions.

A similar approach can be taken if the user "accepts" result document R[1] or other result document R[n]. For example, a modified query vector Q' is created by shifting or adjusting the query vector Q "towards" the result document R[1] in the vector space in response to detecting that the user action accepted the result document R[1]. Recall that a user accepts a result document when the user believes the result document has content that the user is searching for. Shifting the query vector Q towards R[1] may cause different matching results to be identified in the vector space, which are closer to R[1] in the vector space and may be better matching than original result document R[2] or other original result documents [3-n]. Additional details and embodiments are described with reference to FIG. 2.

Figure 2:
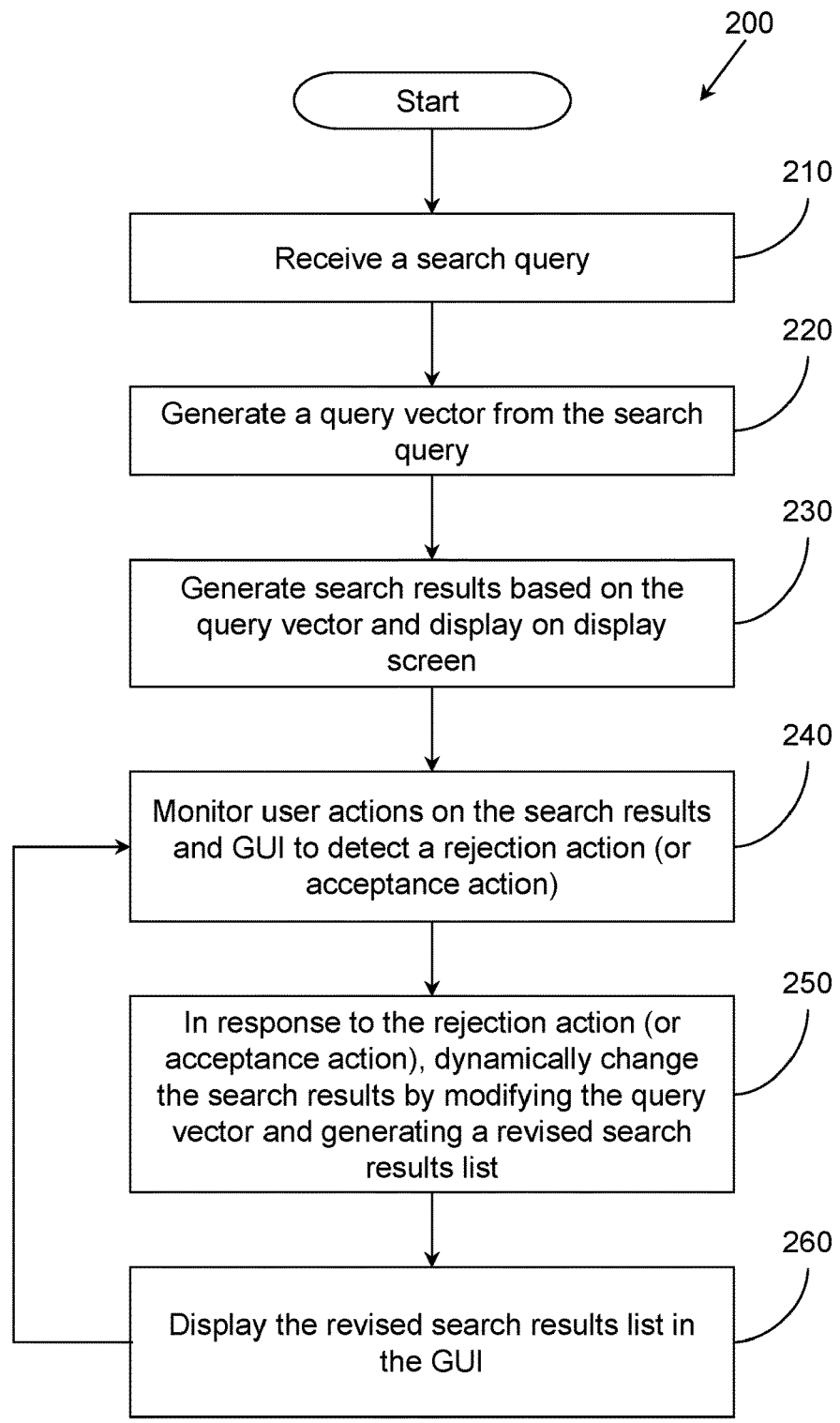
FIG. 2 illustrates one embodiment of a method associated with generating adaptive search responses.

With reference to FIG. 2, one embodiment of a method 200 is illustrated that is associated with generating adaptive search results in response to user actions. In one embodiment, method 200 is implemented and performed by the adaptive search system 100 and will be described accordingly with reference to FIG. 1.

At block 210, the method begins by receiving a search query that was initiated or submitted by a user. For example, the search query may be submitted to the search engine 120 via a browser or other similar application.

At block 220, a query vector is generated that represents the search query. In one embodiment, the search query typically contains words, values, and/or phrases that describe what the user is searching for. The contents of the search query are converted into a vector that numerically represents the query (e.g., a feature vector). The search query may be converted into a vector by the search engine 120 or by a preprocessing algorithm prior to submitting the vector to the search engine. How query vectors are generated is beyond the scope of this disclosure and is not described in detail. Query vectors are understood by those of ordinary skill in the art.

A query feature vector may have hundreds of features, which correspond to hundreds of dimensions (e.g., 384 dimensions, 768 dimensions, etc.). Each query vector defines a vector point in vector space according to the values of all the dimensions/features of the vector. The query vector and thus its associated vector point is used by the search engine to identify nearest neighboring vector points that represent documents, images, or other objects, which become part of the search results. As previously stated, documents, images, and other objects in a repository/database may be represented by their own feature vectors that numerically represent their content.

At block 230, a search results list is generated based on the query vector. For example, the search results list identifies one or more result documents that are found to have vector points near (in proximity to) the vector point of the query vector in the vector space. The search results list is displayed on a display screen of a computing device, via the browser or other graphical user interface (GUI).

At block 240, as the user interacts with the search results list and with the GUI, the system/method monitors the user's actions. For example, the system detects keystrokes, mouse clicks, selections made, browser windows that are opened, webpages that are visited and other navigation actions performed by the user via the GUI/browser. Based on the user actions, the system/method detects whether a rejection action has occurred on a selected document from one or more of the result documents.

In one embodiment, the adaptive search system 100 is configured to identify certain actions that are associated with (correspond to) a user rejecting a result document. In other words, when a result document does not contain the content that the user is searching for, the user responds with particular actions in the browser/GUI. The adaptive search system 100 is configured to detect certain user actions and interpret those actions as rejecting a search result or accepting a search result.

The following example is described with reference to a search result list containing result documents R[1-n] in a ranked order of highest to lowest. Result document R[1] is ranked highest and is considered by the search engine as the best matching document to the search query. Result document R[2] is the second highest ranking document and so on.

For example, the adaptive search system 100 is configured to identify when the user rejects a particular result document, for example, R[1] or other result document. When the user rejects the highest-ranking result R[1], that typically may be interpreted as the search results are not quite accurate and/or not quite what the user was trying to search for.

In one embodiment, rejection actions (and acceptance actions) may be based on different types of feedback determined from the user actions. Some feedback may be explicit feedback, and some may be non-explicit feedback.

Examples of monitored user actions may include, but are not limited to, when the user clicks/selects certain result documents, opens and visits webpages associated with a selected result document, views a result document for a time period (dwell time), closes webpages associated with a result document, does not click/select a highly ranked result document, clicks/selects a lower ranked result document, provides feedback as to whether a result document is accepted or rejected (e.g., by clicking a thumbs up icon or thumbs down icon), etc.

Explicit Feedback Examples

In one embodiment, the search results list may be generated and displayed in the browser with selectable options for each of the result documents in the search results list. The selectable options are configured to explicitly indicate whether the user accepts or rejects a corresponding search result document. The selectable options may include an accept option that indicates a result document is an acceptable match based on the search query, and a reject option that indicates the result document is not an acceptable match based on the search query.

For example, the selectable options may include a thumbs up icon and a thumbs down icon associated with each result document. In response to the user selecting/clicking on a thumbs up icon of a search result document, the system knows that the user believes the associated search result document is a good match for the search query. Thus, this action represents an explicit acceptance action that is feedback to the system.

Conversely, by the user selecting/clicking on a thumbs down icon of a search result document, that tells the system that the user believes the associated search result document is not a good match for the search query. Thus, this action represents an explicit rejection action that is feedback to the system.

Based on this type of explicit feedback, the adaptive search system adjusts the search query vector to reshuffle the search results.

Non-Explicit Feedback Examples

Certain user actions implicitly correspond to a rejection action or an acceptance action of a result document. The adaptive search system 100 may be configured to identify particular actions, combinations of actions, and/or combinations of actions and conditions that may imply that a user rejected a result document or accepted a result document. When the adaptive search system 100 detects these certain actions, the system 100 is configured to conclude that the user rejected (or accepted) a particular result document.

Example 1—Dwell Time: Based on time spent viewing a result document or its web page, the system 100 can infer whether the user believes that the result document is good (accepted) or bad (rejected).

When the dwell time on a result document is short/quick, the system 100 considers that feedback as a rejection action. For example, when the user clicks/selects document R[1], a webpage containing the contents of document R[1] may be opened in a new browser tab, a new browser window, or the same browser window. The system 100 may record the amount of time the user visits and stays on the webpage of R[1] (the active webpage) until the user leaves the webpage. This time is referred to as dwell time.

When the user visits the R[1] webpage and the webpage content is not what the user is looking for, the user typically will navigate back and return to the search results list by switching active browser windows or hitting a "back" navigation button. These navigation actions are detected by the adapted search system 100 and statistics may be collected corresponding to the user actions. When the user's dwell time on the R[1] webpage is less than a first threshold time period (e.g., less than 10 seconds, 0 to 10 second range), the system 100 considers R[1] as being rejected by the user (rejection action).

In one embodiment, when the dwell time on a result document R[1] is between a second threshold range (e.g., 10 seconds to 30 seconds), the system 100 may not immediately conclude that the result document is rejected, but instead sets a confidence score for a rejection possibility. The system 100 then looks for additional user actions in combination to determine if R[1] is rejected by the user.

For example, if the user leaves the R[1] webpage, returns to the search result list, and then clicks on result document R[2], which is a lower ranking search result than R[1], then the confidence score goes up for result R[1] being rejected by the user.

When the dwell time on a result document R[n] is greater than the defined second threshold time period (e.g., greater than 30 seconds), the system 100 is configured to conclude that the user has accepted the result document R[n]. Thus, an acceptance action is detected since the user is viewing the result document R[n] for an extended time.

Example 2—Not Selecting Result R[1]: When the user skips over result document R[1], which the search engine considers the best matching search result, and selects a lower ranked result document, then that is a strong signal, that result document R[1] is rejected. Thus, the adaptive search system 100 may be configured to conclude that the first result document R[1] is rejected in response to the user selecting the second result document R[2] displayed in the search results list without the first result document R[1] being selected or viewed by the user.

Example 3—Open and Close New Tab or Window: In some embodiments, when a user clicks/selects a result document from the search result list, an associated webpage or document may be displayed in a new tab on the browser or in a new opened window. The new tab or window is now the active window among any other opened browser windows and tabs. The user's dwell time is recorded. If the user closes the new tab or the new window within a rejection threshold time (e.g., 0 to 10 seconds), that is determined as a rejection action. If the user does not close the new tab or window but rather navigates back to the search result tab within the rejection threshold, that is determined as a rejection action.

Thus, a combination of user actions and/or a combination of monitored conditions/signals may be defined as indicating a rejection action. These examples are not intended to be limiting and other user actions may be defined and configured to indicate a rejection action on a result document, as well as actions that indicate an acceptance action.

At block 250, in response to detecting a rejection action has occurred on a result document, the adaptive search system 100 dynamically modifies the search results list in real time without requiring the user to change or modify the original search query.

For example, in response to the user rejecting result document R[1], a modified query vector is generated by removing content associated with the rejected document from the query vector. In one embodiment, removing the content associated with the rejected document may include subtracting a document vector of the rejected document from the query vector. In other words, the query vector is shifted away from the rejected document vector in the vector space.

The modified query vector is then submitted to the search engine to generate a revised search results list. These actions are performed by the system without the user changing the original search query.

In one embodiment, modifying the query vector by removing content may include generating a difference vector between the query vector and a vector representing the rejected document that is associated with the rejection action. The query vector is then shifted based at least in part on the difference vector to generate the modified query vector.

In one embodiment, shifting the query vector includes normalizing the difference vector and adding the difference vector with a scaling factor to the query vector to generate the modified query vector. This is described in more detail below.

At block 260, the revised search results list is displayed on the GUI on the display screen. This may include displaying the revised search results in a pop-up window or new window so that the user may see both the original search results and the revised results. In one embodiment, a notification may be generated and displayed to notify the user that revised search results have been generated and are available. For example, the notification may be generated as an alert message that is displayed on the GUI and may include a link to display the revised search results.

The method 200 may then return to block 240 and repeat the functions of monitoring the user actions and generating newly revised search results in response to the user actions. In this manner, the system and method may continuously update the search results to improve the search results each time a search result document is rejected by the user in real time.

Modifying a Query Vector—Shifting Away From Rejected Result

In one embodiment, a query vector may be modified/adjusted as follows. In the first example, the adaptive search system 100 is configured to generate the modified query vector in response to a result document being rejected. This is described with reference to FIG. 3. The second example shows a modified query vector being generated in response to a result document being accepted by a user, in one embodiment. This is described with reference to FIG. 4.

In one embodiment, a search query created by a user is in text form. Converting the text search query into a numerical vector may be performed using a variety of transformation models. The present system is not limited to a particular model. One example model may be BERT, which stands for Bidirectional Encoder Representations from Transformers. The BERT model may be configured to use a transformation based on a sentence-transformer model called "all-MiniLM-L12-v2" that maps a sentence/paragraph to a vector of dimension 384. As previously explained, how a text search query is converted to a numerical query vector is beyond the scope of this disclosure.

Figure 3:
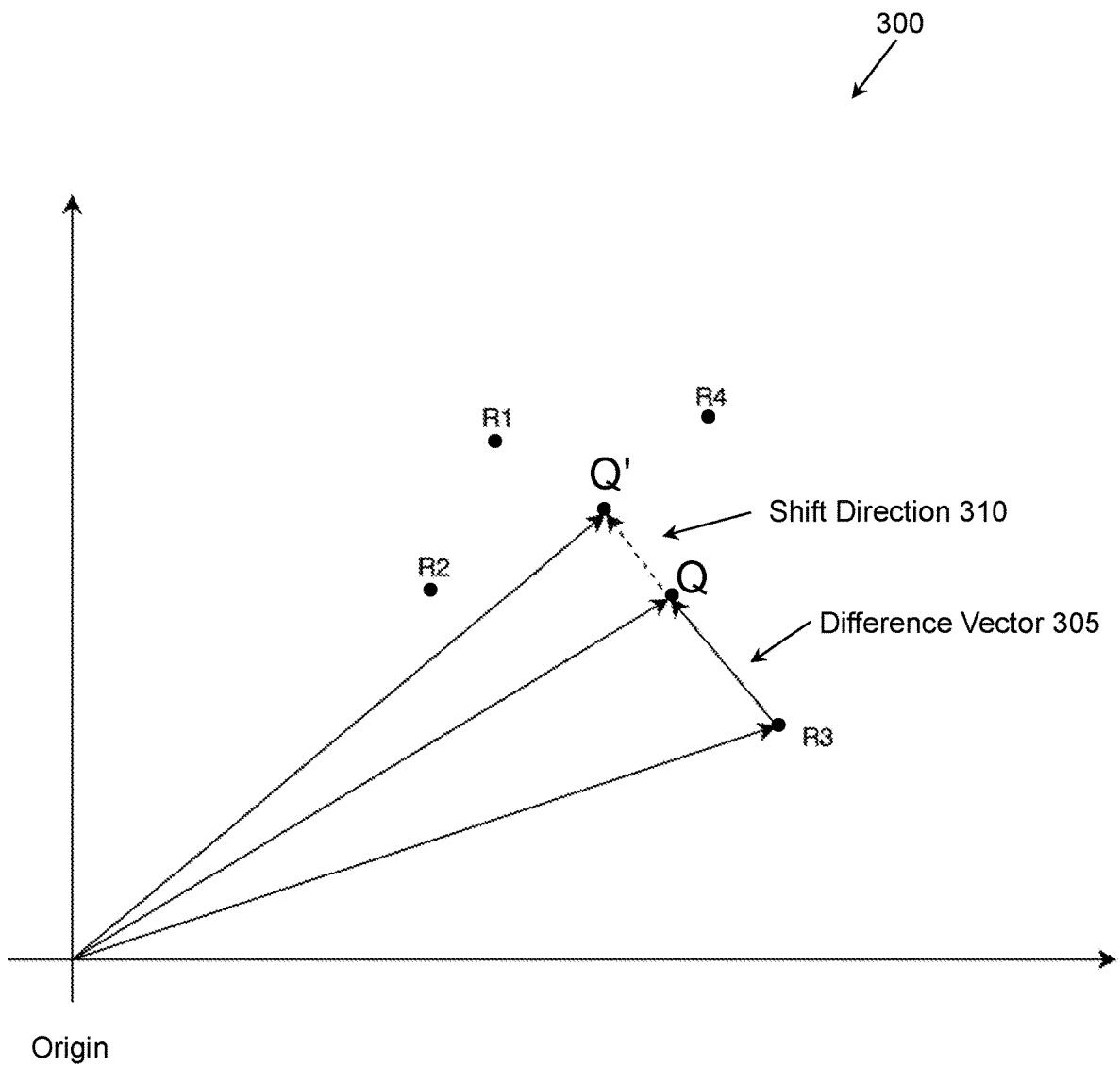
FIG. 3 illustrates one embodiment of shifting a query vector away from a rejected search result document.

With reference to FIG. 3, one embodiment of generating a modified query vector Q' is shown that is obtained by shifting query vector Q "away" from a rejected result document R[3]. For simplicity, FIG. 3 illustrates a visual representation of a 2-dimensional vector space 300 although the actual vector space may have hundreds of dimensions based on dense vectors. For example, each vector may have a dimension of 384 or 768.

Consider a text search query is converted into a numerical query vector Q. Based on query vector Q, a search engine generates a set of results R1, R2, R3 and R4. For simplicity, FIG. 3 is illustrated as a 2-dimensional vector space 300 showing a vector point for query vector Q and the vector points representing each of the search result documents R1, R2, R3 and R4. As previously explained, each document is represented by a numerical vector, which is how the search engine determines the best matching (closest proximity) documents to the search query vector.

In response to the adaptive search system 100 determining that the user has rejected/discounted result R3, the system 100 may generate a new revised query vector Q' using Equation 1 as follows:

$$Q'=Q+k*(Q-R3)/\|Q-R3\| \qquad \text{EQ. 1}$$

Where Q is the original search query vector, R3 is the vector of rejected result document R3, and k represents a scaling factor.

With this calculation, vector Q' is found by shifting vector Q in a direction "away" from the rejected document vector R3 in the vector space.

Subtracting Q–R3 represents a difference vector 305 between the query vector Q and the rejected/discounted result vector R3. The difference vector 305 is normalized by dividing it with its norm $\|Q-R3\|$.

The direction of the normalized difference vector 305 is the direction of the shift away from vector R3 represented by the shift direction 310. The size or amount of the shift is controlled by the scaling factor k multiplied by the difference vector, which is described below. Thus, adding that result to the original vector Q shifts the vector Q to the new vector point Q', which is in a direction away from R3. The vector Q' represented by vector point Q' becomes the new modified search vector Q'.

In one embodiment, an assumption made by the adaptive system 100 is that the original query Q is close to what the user was looking for but is not perfect.

Thus, after the user rejects one of the search result documents, the system 100 can adjust the query vector to improve the search results by shifting the query vector away from the rejected document.

The system then performs a new search with the new query vector Q' that will generate a different search result space and different results list, even if the results are only slightly adjusted from the previous search results list. The new results list will be based on document vectors that are in close proximity to vector Q'.

By shifting the query vector Q away from the rejected document R3, the system 100 indicates to the search engine and its vector search mechanism to disregard document R3 from the vector proximity calculation. Since R3 is farther away from new vector Q' than from original vector Q, R3 may no longer be in close proximity to the search vector Q'. This may result in R3 being placed in a lower position in the search results list because it is not as good of a match, or R3 may be entirely removed from the results list. Also, the other result documents may be reordered based on their new proximity to new query vector Q'. This adjustment may be repeated for each result document that is rejected by the user.

Modifying a Query Vector—Shifting Towards a Positive Result

Figure 4:
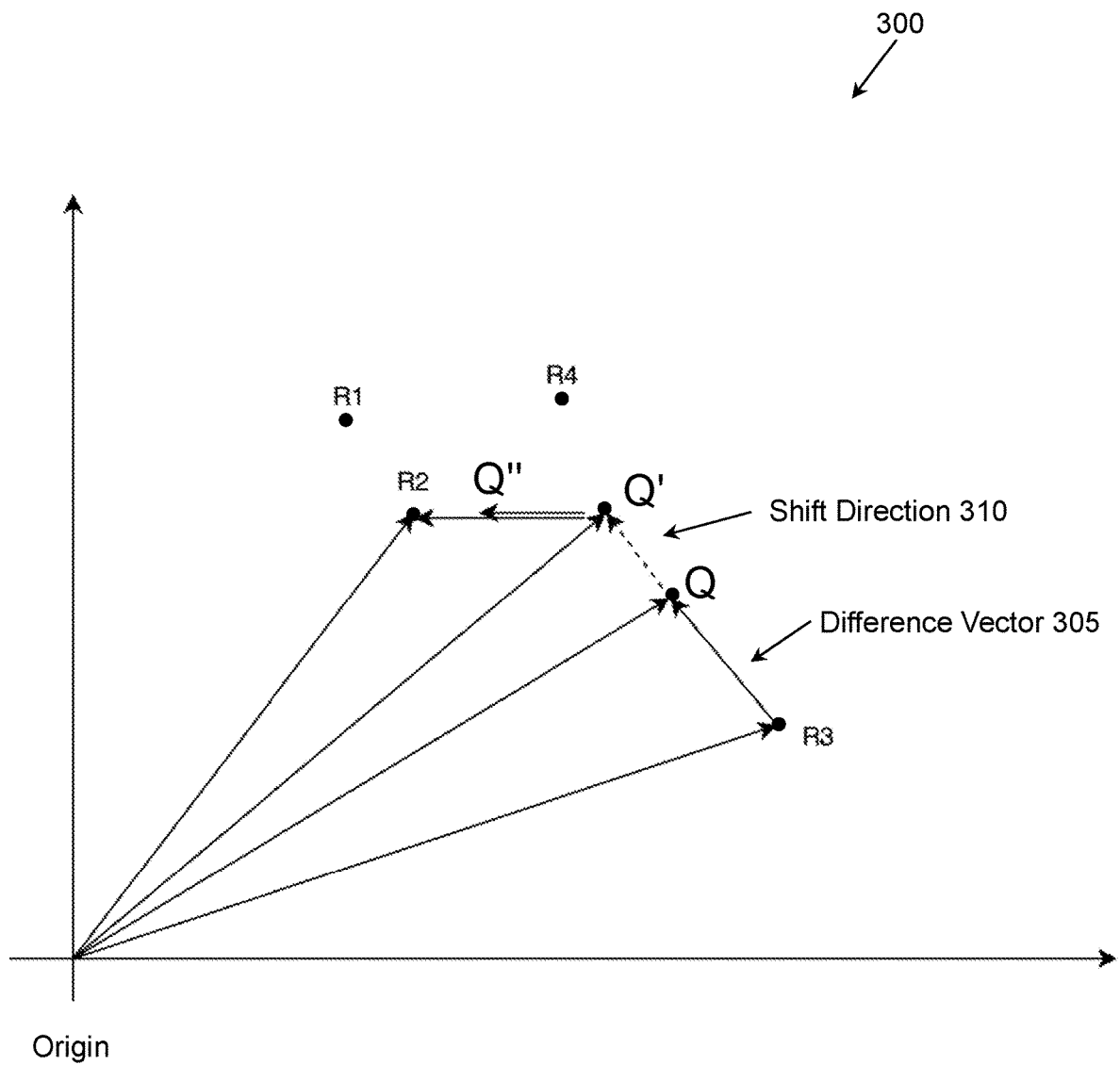
FIG. 4 illustrates one embodiment of shifting a query vector towards from an accepted search result document.

With reference to FIG. 4, the vector space 300 and search results of FIG. 3 are adjusted by adding positive results based on an acceptance of result document R2. Here, FIG. 4 shows original query vector Q being shifted twice: first by being shifted away from rejected/discounted result R3 (from FIG. 3) and then second by being shifted "towards" a positive result R2, which was accepted by a user.

FIG. 4 is shown with the assumption that, in the search result list, result R3 was returned before result R2. In this case, adjusted vector Q' is obtained by moving/shifting vector Q first in the shift direction based on the difference vector Q-R3 as explained in FIG. 3 and equation 1 (also displayed in FIG. 4). Afterwards, the system 100 is adjusting Q' by moving Q' in a shift direction "towards" positive result R2 to obtain modified query vector Q". In one embodiment, shifting the query vector Q' towards positive result vector R2 is shown in Equation 2:

$$Q''=Q'+p*(R2-Q')/\|R2-Q'\| \qquad \text{EQ. 2}$$

For an accepted result document, the current query vector is moved/shifted in a direction towards the vector of the accepted result document. In this example, current vector Q' is moved towards R2 to obtain new query vector Q".

In one embodiment, for shifting positive results, a scaling factor p may be used. Scaling factor p may be the same as scaling factor k (for rejected results). However, the scaling factor may have different values for good (accepted) or bad (rejected) results.

In another embodiment, the scaling factor may be assigned values that are based on the rank position of the result document that was rejected or accepted. In search results lists, the rank order of the result documents is relevant. Thus, the scaling factor may be different for each document based on the rank of the document. For example, if the result list is R1, R2, R3, and R4, where R1 is the highest-ranking document, the scaling factor values may be k for R1, k/2 for R2, k/3 for R3, and k/4 for R4. In this scheme, the scaling factor is greater for a higher-ranking result document. The assumption here is that if the first result R1 is bad and is rejected by the user, the system may want to shift the query vector by a greater amount than in the case when the 4th result R4 is bad and is rejected.

In one embodiment, scaling factor k as used in equation 1 $Q'=Q+k*(Q-R3)/\|Q-R3\|$ may be defined as follows:
If k=0 there is no scaling and Q'=Q;
If k=|Q-R3| then Q'=2Q-R3 in which case Q' is the vector opposite to R3 relative to Q. Q'-Q=Q-R3. If a query Q is executed and we get a result R3 which is rejected/discounted with k=$\|Q-R3\|$, the system would re-run the query with a vector that is complementary to R3 in report to Q.

In one embodiment, the scaling factor may be assigned as k=d*$\|Q-R3\|$ where d takes values between 0 and 1. Examples of values that can be used for d: 0.2; 0.3; 0.5; 0.7

Values for scaling factor p (for accepted result document):
If p=0, there is no scaling and in the previous example Q"=Q'.
If p=$\|R2-Q'\|$, the system may execute a query with the vector that initially matched (R2). This can be interpreted as executing a query Q and we get the result R2 which the system knows is a good fit for Q since the user accepted R2.

Then, the system may execute a query with R2 to see if the search engine can find more results similar to R2 that would answer query Q.

In another embodiment, scaling factor p may be assigned similar as scaling factor k. In this case, p takes values between 0 and ||R2−Q'|| therefore we can note p=c*||R2−Q'|| where c would take values between 0 and 1. Example of values that can be used for c: 0.4; 0.7; 0.9 or even 1.

Accordingly, with the present adaptive search system 100, search results may be continuously adjusted in real time and improved based on whether a user rejects search result documents and accepts search result documents. Thus, the present system takes into account any search result in a search result list that the user has looked at to dynamically recalculate the query and identify a better possible search result list, without the user having to go back and adjust the query statement and reissue the query themselves. This provides an advantage over previous static search techniques that are "one and done" that only provide one search result list and do not perform any other responsive actions until the user manually changes the search query.

Cloud or Enterprise Embodiments

In one embodiment, the adaptive search system 100 is a computing/data processing system including an application or collection of distributed applications for enterprise organizations. The applications and system 100 may be configured to operate with or be implemented as a cloud-based networking system, a software as a service (SaaS) architecture, or other type of networked computing solution. In one embodiment the adaptive search system 100 may be part of a centralized server-side application that provides at least the functions disclosed herein and that is accessed by many users via computing devices/terminals communicating with the computing system (functioning as the server) over a computer network.

In one embodiment, one or more of the components described herein are configured as program modules stored in a non-transitory computer readable medium. The program modules are configured with stored instructions that when executed, by at least a processor of a computing device, cause the computing device to perform the corresponding function(s) as described herein.

Computing Device Embodiment

Figure 5:
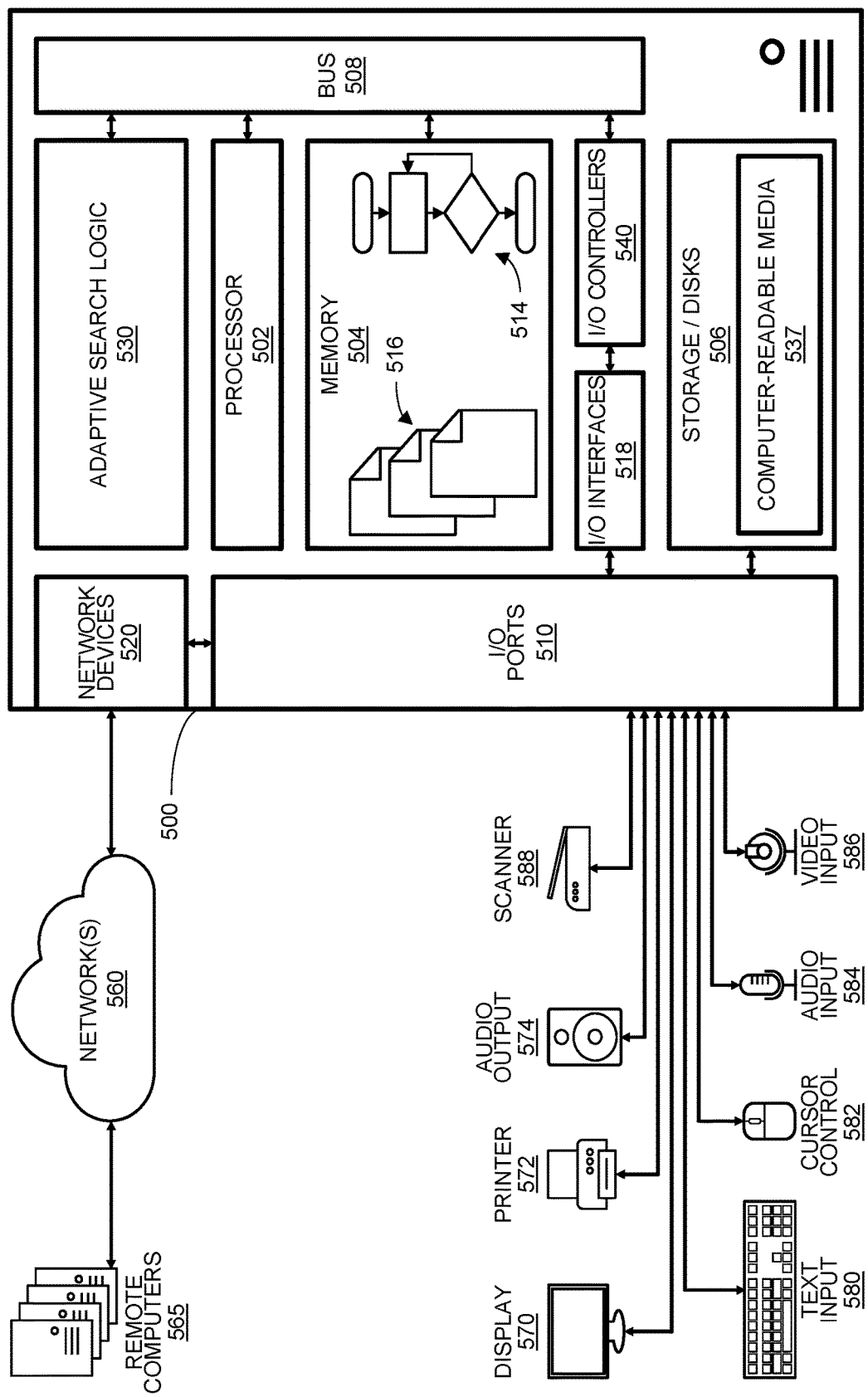
FIG. 5 illustrates an embodiment of a computing system configured with the example systems and/or methods disclosed.

FIG. 5 illustrates an example computing device that is configured and/or programmed as a special purpose computing device with one or more of the example systems and methods described herein, and/or equivalents. The example computing device may be a computer 500 that includes at least one hardware processor 502, a memory 504, and input/output ports 510 operably connected by a bus 508. In one example, the computer 500 may include adaptive search logic 530 configured to facilitate generating adaptive search responses similar to the adaptive search system 100 and/or method 200 shown in FIGS. 1-4.

In different examples, the logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate generating adaptive search responses similar to the adaptive search system 100 and/or method 200 shown in FIGS. 1-4. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing the functions of the adaptive search system 100 and method 200.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method performed by a computing device, the method comprising:
   receiving a search query initiated by a user;
   generating a query vector that represents the search query;
   generating a search results list based on the query vector, wherein the search results list identifies one or more result documents;
   displaying the search results list on a display screen;
   monitoring user actions with the search results list to detect a rejection action on a selected document from the one or more result documents;
   in response to detecting the rejection action:
      generating a modified query vector by removing content associated with the selected document from the query vector; and
      submitting the modified query vector to a search engine to generate a revised search results list without the user changing the search query; and
      displaying the revised results list on the display screen.

2. The method of claim 1, wherein modifying the query vector by removing content includes:
   generating a difference vector between the query vector and a vector representing the selected document that is associated with the rejection action; and
   shifting the query vector based at least in part on the difference vector to generate the modified query vector.

3. The method of claim 2, wherein shifting the query vector further includes:
   normalizing the difference vector; and
   adding the difference vector with a scaling factor to the query vector to generate the modified query vector.

4. The method of claim 1, wherein monitoring user actions with the search results list to detect the rejection action comprises:
   detecting that the user visits a webpage corresponding to the selected document and views the webpage for a dwell time;
   detecting that the user returns to the search results list after the dwell time; and
   determining that the user rejected the selected document in response to the dwell time being less than a threshold time period.

5. The method of claim 1, wherein monitoring the user actions with the search results list further comprises:
   providing, on a graphical user interface, selectable options for each of the one or more result documents in the search results list;
   wherein the selectable options include an accept option that indicates a result document is an acceptable match based on the search query, and a reject option that indicates the result document is not an acceptable match based on the search query.

6. The method of claim 1, wherein the one or more result documents of the search results list are displayed in a ranked order of best matching documents to the search query, where a first document listed is regarded as better matching than a second document listed;
   wherein monitoring the user actions with the search results list to detect a rejection action further comprises:
   determining that the first document is rejected in response to the user selecting the second document displayed in the search results list without the first document being selected.

7. A non-transitory computer-readable medium that includes stored thereon computer-executable instructions that when executed by at least a processor of a computer cause the computer to:
   monitor user actions of a user performed on a search results list in a graphical user interface, wherein the search results list is obtained based on a query vector representing a search query;
   dynamically modify the query vector in response to the user actions on a selected result document from the search results list by:
      shifting the query vector away from the selected result document in a vector space in response to detecting that the user action rejected the selected result document; and
      shifting the query vector towards the selected result document in the vector space in response to detecting that the user action accepted the selected result document; and
   generate a revised search results list without the user changing the search query by executing the modified query vector in a search engine in response to the query vector being modified.

8. The non-transitory computer-readable medium of claim 7, wherein the computer-executable instructions are configured to dynamically modify the query vector by:
   wherein the query vector, represented as Q, is shifted away from the selected result document in the vector space by:
      determining a result vector R that represents the selected result document;
      determining a difference vector Q-R based on at least subtracting the result vector R from the query vector Q; and
      adding at least the difference vector to the query vector Q to generate the modified query vector;
   wherein the query vector Q is shifted towards the selected result document in the vector space by:
      determining the difference vector R-Q based on at least subtracting the query vector Q from the result vector R; and
      adding at least the difference vector to the query vector Q to generate the modified query vector.

9. The non-transitory computer-readable medium of claim 7, wherein the computer-executable instructions are configured to dynamically modify the query vector by:
   generating a difference vector between the query vector and a vector representing the selected result document; and
   shifting the query vector in the vector space in a direction based at least in part on a direction of the difference vector to generate the modified query vector.

10. The non-transitory computer-readable medium of claim 7, wherein the computer-executable instructions are configured to monitor the user actions with the search results list and to detect that the user action rejected the selected result document by:
  detecting that the user visits a webpage corresponding to the selected result document and views the webpage for a dwell time;
  detecting that the user returns to the search results list after the dwell time; and
  determining that the user rejected the selected result document in response to the dwell time being less than a threshold time period.

11. The non-transitory computer-readable medium of claim 7, further comprising instructions that when executed by at least the processor cause the processor to:
  display result documents of the search results list in a ranked order of best matching documents to the search query, where a first result document listed is regarded as matching the search query better than a second result document listed;
  wherein monitoring the user actions with the search results list includes detecting a rejection action by:
  determining that the first result document is rejected in response to the user selecting the second result document displayed in the search results list without the first result document being selected.

12. The non-transitory computer-readable medium of claim 7, further comprising instructions that when executed by at least the processor cause the processor to:
  continuously revise the search results list in real time by modifying the query vector each time the user action is detected to reject a result document from the search results list.

13. The non-transitory computer-readable medium of claim 7, wherein the search query includes keywords and wherein the query vector is a numerical vector having multiple dimensions that represent the search query.

14. The non-transitory computer-readable medium of claim 7, further comprising instructions that when executed by at least the processor cause the processor to:
  generate and display a notification to notify the user that the revised search results list has been generated and is available for display.

15. A computing system, comprising:
  at least one processor connected to at least one memory;
  a non-transitory computer readable medium including executable instructions stored thereon that when executed by at least the processor cause the processor to:
    monitor user actions of a user performed on a search results list in a graphical user interface, wherein the search results list is obtained based on a query vector representing a search query;
    dynamically modify the query vector in response to the user actions on a selected result document from the search results list by:
      shifting the query vector away from the selected result document in a vector space in response to detecting that the user action rejected the selected result document; and
    generate a revised search results list without the user changing the search query by executing the modified query vector in a search engine in response to the selected result document being rejected.

16. The computing system of claim 15, wherein the executable instructions are further configured to cause the processor to:
  shift the query vector, represented as Q, away from the selected result document in the vector space by:
    determining a result vector R that represents the selected result document;
    determining a difference vector Q-R based on at least subtracting the result vector R from the query vector Q; and
    adding at least the difference vector to the query vector Q to generate the modified query vector;
  shift the query vector Q towards the selected result document in the vector space in response to detecting that the user action accepted the selected result document by:
    determining the difference vector R-Q based on at least subtracting the query vector Q from the result vector R; and
    adding at least the difference vector to the query vector Q to generate the modified query vector.

17. The computing system of claim 15, wherein the executable instructions are configured to dynamically modify the query vector by:
  generating a difference vector between the query vector and a vector representing the selected result document; and
  shifting the query vector in the vector space in a direction based at least in part on a direction of the difference vector to generate the modified query vector.

18. The computing system of claim 15, wherein the executable instructions are configured to monitor the user actions with the search results list and to detect that the user action rejected the selected result document by:
  detecting that the user visits a webpage corresponding to the selected result document and views the webpage for a dwell time;
  detecting that the user returns to the search results list after the dwell time; and
  determining that the user rejected the selected result document in response to the dwell time being less than a threshold time period.

19. The computing system of claim 15, further comprising instructions that when executed by at least the processor cause the processor to:
  display result documents of the search results list in a ranked order of best matching documents to the search query, where a first result document listed is regarded as matching the search query better than a second result document listed;
  wherein monitoring the user actions with the search results list includes detecting a rejection action by:
  determining that the first result document is rejected in response to the user selecting the second result document displayed in the search results list without the first result document being selected.

20. The computing system of claim 15, further comprising instructions that when executed by at least the processor cause the processor to:
  continuously revise the search results list in real time by modifying the query vector each time the user action rejects a result document from the search results list.

* * * * *

UNITED STATES PATENT AND TRADEMARK OFFICE
CERTIFICATE OF CORRECTION

PATENT NO. : 12,067,038 B2
APPLICATION NO. : 18/093206
DATED : August 20, 2024
INVENTOR(S) : Stowell et al.

It is certified that error appears in the above-identified patent and that said Letters Patent is hereby corrected as shown below:

On the Title Page

Column 2, Item (56) under other publications, Line 1, delete "Kuehua" and insert -- Xuehua --, therefor.

In the Specification

In Column 10, Line 52, delete "|Q-R3|" and insert -- ||Q-R3|| --, therefor.

In Column 10, Line 60, delete "0.7" and insert -- 0.7. --, therefor.

In Column 13, Line 8, delete "on)." and insert -- on. --, therefor.

Signed and Sealed this
Seventh Day of January, 2025

Derrick Brent
*Acting Director of the United States Patent and Trademark Office*